United States Patent
Shinohara

(10) Patent No.: US 7,310,514 B2
(45) Date of Patent: Dec. 18, 2007

(54) TRANSMISSION-ORIGIN MOBILE TELEPHONE CAPABLE OF DETECTING THE MEDIA TYPES AND DATA FORMATS OF A MULTIMEDIA MESSAGE RECEIVABLE BY DESTINATION MOBILE TELEPHONES IN A MULTIMEDIA COMMUNICATION SYSTEM

(75) Inventor: Masahito Shinohara, Tokyo (JP)

(73) Assignee: NEC Corporation, Tokyo (JP)

( * ) Notice: Subject to any disclaimer, the term of this patent is extended or adjusted under 35 U.S.C. 154(b) by 1029 days.

(21) Appl. No.: 10/097,321

(22) Filed: Mar. 15, 2002

(65) Prior Publication Data

US 2002/0132608 A1 Sep. 19, 2002

(30) Foreign Application Priority Data

Mar. 16, 2001 (JP) .............................. 2001-076015

(51) Int. Cl.
*H04M 1/663* (2006.01)
*H04M 11/00* (2006.01)
*H04L 29/08* (2006.01)

(52) U.S. Cl. .............................. 455/412.2; 455/556.1; 455/566; 455/414.4; 379/88.14; 709/219

(58) Field of Classification Search ............. 455/412.1, 455/414.4, 550.1; 709/219; 379/88.13, 379/88.14

See application file for complete search history.

(56) References Cited

U.S. PATENT DOCUMENTS

| 5,832,221 | A | * | 11/1998 | Jones | .......................... 709/206 |
| 5,859,898 | A | * | 1/1999 | Checco | .................... 379/88.01 |
| 5,943,398 | A | * | 8/1999 | Klein et al. | .............. 379/88.13 |
| 5,987,100 | A | * | 11/1999 | Fortman et al. | .......... 379/88.14 |
| 6,072,862 | A | * | 6/2000 | Srinivasan | ............. 379/100.08 |
| 6,203,192 | B1 | * | 3/2001 | Fortman | .................. 379/88.14 |
| 6,333,973 | B1 | * | 12/2001 | Smith et al. | ............. 379/88.12 |
| 6,421,707 | B1 | * | 7/2002 | Miller et al. | ................ 709/206 |

(Continued)

FOREIGN PATENT DOCUMENTS

EP 1 035 686 A2 9/2000

(Continued)

OTHER PUBLICATIONS

European Search Report dated Aug. 1, 2002.

*Primary Examiner*—Fan Tsang
*Assistant Examiner*—Lisa Hashem
(74) *Attorney, Agent, or Firm*—McGinn IP Law Group, PLLC

(57) ABSTRACT

A multimedia communication system is disclosed in which a mobile telephone that originates transmission can detect the media types and formats of a multimedia message that can be received by destination mobile telephones. Information regarding data formats that can be received by each mobile telephone is stored in an MMS user database server. The MMS user database server receives from the transmission-origin mobile telephone destination information and format information for each media type of the multimedia message that is to be transmitted and determines whether the multimedia message can be received at the transmission-destination mobile telephones based on this destination information and format information. The MMS user database server then notifies the transmission-origin mobile telephone the results of the determination, whereupon the transmission-origin mobile telephone determines whether to transmit the multimedia message without alteration or to modify the format of the multimedia message.

16 Claims, 7 Drawing Sheets

U.S. PATENT DOCUMENTS

| | | | |
|---|---|---|---|
| 6,442,250 B1* | 8/2002 | Troen-Krasnow et al. | 379/93.15 |
| 6,594,349 B2* | 7/2003 | Fortman | 379/88.14 |
| 6,633,630 B1* | 10/2003 | Owens et al. | 379/93.24 |
| 6,654,601 B2* | 11/2003 | Picoult et al. | 455/412.1 |
| 6,848,008 B1* | 1/2005 | Sevanto et al. | 709/249 |
| 6,956,832 B1* | 10/2005 | Muhonen et al. | 370/310 |
| 2002/0087704 A1* | 7/2002 | Chesnais et al. | 709/228 |
| 2005/0159135 A1* | 7/2005 | Kim | 455/410 |
| 2005/0243978 A1* | 11/2005 | Son et al. | 379/88.13 |

FOREIGN PATENT DOCUMENTS

| | | |
|---|---|---|
| GB | 2 360 174 A | 9/2001 |
| JP | 10-107833 | 4/1998 |
| JP | 10-136012 | 5/1998 |
| JP | 10-243048 | 9/1998 |
| JP | 2000-201175 | 7/2000 |
| JP | 2000-261554 | 9/2000 |
| WO | WO 98/19438 | 5/1998 |
| WO | WO 99/56431 | 11/1999 |
| WO | WO 99/66746 | 12/1999 |
| WO | WO 01/33781 A1 | 5/2001 |
| WO | WO 01/35622 A1 | 5/2001 |

* cited by examiner

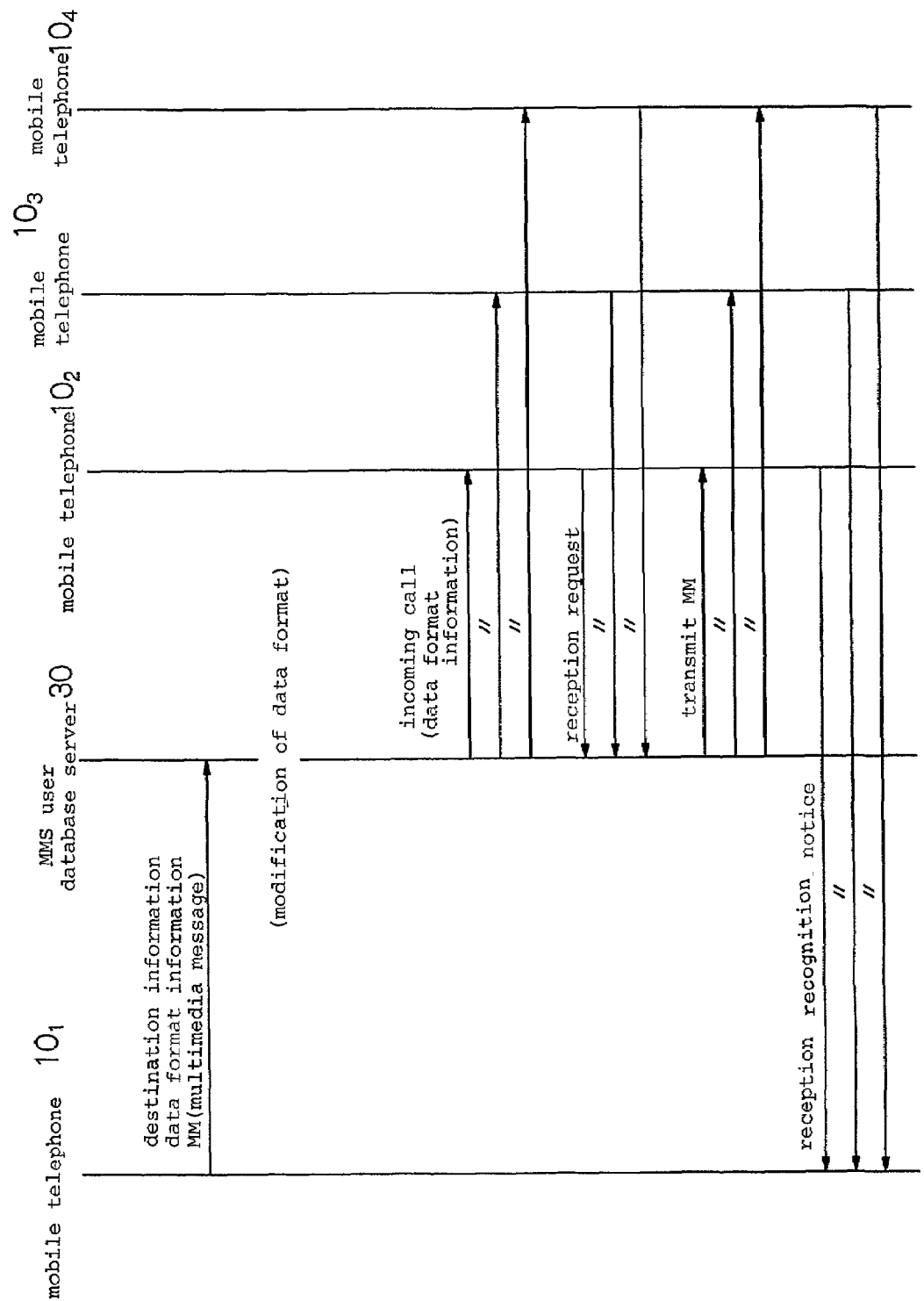

TRANSMISSION-ORIGIN MOBILE TELEPHONE CAPABLE OF DETECTING THE MEDIA TYPES AND DATA FORMATS OF A MULTIMEDIA MESSAGE RECEIVABLE BY DESTINATION MOBILE TELEPHONES IN A MULTIMEDIA COMMUNICATION SYSTEM

BACKGROUND OF THE INVENTION

1. Field of the Invention

The present invention relates to a multimedia communication system comprising a plurality of mobile wireless communication terminals and a network for interconnecting each of the mobile wireless communication terminals; and in more particularly to a method of transmitting and receiving multimedia messages that are composed of data of a plurality of media types between mobile wireless communication terminals.

2. Description of the Related Art

In recent years, the capability to transmit and receive messages such as text between mobile wireless communication terminals such as mobile telephones has been widely used. FIG. 1 shows the configuration of such a mobile telephone system of the prior art. In FIG. 1, the mobile wireless communication terminals are assumed to be mobile telephones.

As shown in FIG. 1, the mobile telephone system of the prior art comprises: mobile telephones 110 and 120; HLR (home location register) 40 which is a database for registering subscriber information of subscribers to the mobile telephone system and information such as positional information of mobile telephones whose powers are turned on; mail server 150; and network 60. Network 60 comprises a base station, a base station control device, and the like and interconnects mobile telephones 110 and 120 as well as HLR 40 and mail server 150.

A procedure for transmitting a message from mobile telephone 110 to mobile telephone 120 in the mobile telephone system of the prior art will be explained below with reference to the sequence chart of FIG. 2.

Mobile telephone 110 first transmits a message addressed to mobile telephone 120 to mail server 150 by way of network 60. Mail server 150 holds the message from mobile telephone 110 and notifies mobile telephone 120 of the incoming call. When received the notification of the incoming call from mail server 150, mobile telephone 120 checks the content of the message that has been transmitted, and requests mail server 150 for reception. After receiving the reception request from mobile telephone 120, mail server 150 transmits the content of the message that it holds to mobile telephone 120. Finally, after receiving the message from mail server 150, mobile telephone 120 transmits a reception recognition notice indicating that the message has been received to mobile telephone 110 by way of network 60.

The mobile telephone system of the prior art enables transmission and reception of messages between each of the mobile telephones. However, the slow transmission rates of wireless communication methods that are employed in mobile telephone systems that are now in practical use has complicated the transmission and reception, as messages, of bulky data such as dynamic images. The type of data that can be transmitted and received as a message has therefore been limited to data such as text data. When a static image is added to text data, the format is set for each media type and transmission and reception is possible only by means of the set format.

The anticipated adoption of wireless communication methods such as the CDMA (Code Division Multiple Access) communication method in the next-generation mobile telephone systems will increase data transmission rates. In these next-generation mobile telephone systems, it will be possible to transmit and receive a variety of data including text, graphics, video, and audio, as messages.

In a multimedia message service (MMS) that can transmit and receive data of a plurality of media types as messages, it is expected that data of various types of formats, though the same video data, will be transmitted and received as messages.

In a multimedia communication system that offers this MMS, moreover, it is expected that connecting an external terminal to a mobile wireless communication terminal such as a mobile telephone will enable an extension of the range of media types and formats that can be received.

Despite the realization of this type of MMS, however, it will still not be possible for a mobile wireless communication terminal that is the origin of transmission to detect the types of data that can be received as a message at the mobile wireless communication terminals that are the destinations. Thus, when data of various media types and formats are transmitted and received as messages as in the prior art, there is the possibility for the occurrence of problems such as the inability of transmission-destination mobile wireless communication terminals to receive a multimedia message that has been transmitted from a particular mobile wireless communication terminal.

In particular, when the range of media types and data formats that can be received varies according to whether or not an external terminal is connected to the mobile wireless communication terminal, the current state of the destination mobile wireless communication terminals may prevent reception of a multimedia message of the same media type and data format as a multimedia message that was previously receivable. Thus, even a particular mobile wireless communication terminal has transmitted a multimedia message of the same media type and data format as a multimedia message that was previously receivable, transmission-destination mobile wireless communication terminals may in some cases be unable to receive the multimedia message.

SUMMARY OF THE INVENTION

It is an object of the present invention to provide a method of transmitting and receiving messages and a multimedia communication system in which the media type and format of data that can currently be received at destination mobile wireless communication terminals is detected at the mobile wireless communication terminal that is the transmission origin, thereby avoiding the occurrence of problems such as inability of a destination mobile wireless communication terminal to receive a multimedia message that has been transmitted from the mobile wireless communication terminal that is the transmission origin.

To achieve the above-described object, in the first aspect of the present invention, format information for each media type of a multimedia message that is to be transmitted and destination information of the multimedia message are transmitted to an MMS user database server from the mobile wireless communication terminal that is the transmission origin that is to transmit the multimedia message. The MMS user database server stores processing capability information regarding each media type for each mobile wireless communication terminal, the processing capability information being information regarding the media types that can be received as a message by each mobile wireless communication terminal and the formats for each media type that can be received. Based on destination information and format information for each media type that have been received from the transmission-origin mobile wireless communication terminal and the processing capability information for each media type for each mobile wireless communication terminal that is stored, the MMS user database server determines whether the multimedia message that is to be transmitted by the transmission-origin mobile wireless communication terminal can be received at each of the transmission-destination mobile wireless communication terminals. The MMS user data base server then notifies the transmission-origin mobile wireless communication terminal of the determination results together with information regarding the formats that can be received by mobile wireless communication terminals that cannot receive the multimedia message.

After having received the determination results from the MMS user database server, the transmission-origin mobile wireless communication terminal transmits the multimedia message in the format that is finally determined for transmission to the MMS user database server with the transmission-destination mobile wireless communication terminals that are finally determined as the destinations. After receiving the multimedia message from the transmission-origin mobile wireless communication terminal, the MMS user database server stores this multimedia message in MMS servers and transmits a reception notice indicating that a multimedia message has arrived to the transmission-destination mobile wireless communication terminals. After receiving the reception notice, the transmission-destination mobile wireless communication terminals send reception requests to the MMS user database server indicating the desire to receive the multimedia message. After receiving the reception requests from the transmission-destination mobile wireless communication terminals, the MMS user database server transmits the multimedia message that is stored in the MMS servers to the transmission-destination mobile wireless communication terminals.

According to the present invention, the provision of the function of registering processing capability information for each media type for each mobile wireless communication terminal in an MMS user database server allows a transmission-origin mobile wireless communication terminal to transmit a multimedia message after checking the processing capability of the transmission-destination mobile wireless communication terminal even when the range of types and formats of multimedia messages that can be received by a mobile wireless communication terminal has been extended by connecting an external terminal. The occurrence of problems such as the inability of a transmission-destination mobile wireless communication terminal to receive a multimedia message that has been transmitted from a transmission-origin mobile wireless communication terminal can thus be avoided, and confusion encountered when transmitting and receiving multimedia messages can be eliminated.

In an embodiment of the present invention, a MMS user database server that has received a multimedia message from a transmission-origin mobile wireless communication terminal reports that data of a media type format that cannot be received are contained in the multimedia message when transmitting the reception notice indicating that a multimedia message has arrived to the transmission-destination mobile wireless communication terminals.

According to the present embodiment, when it is reported that data of a format that cannot be received according to the current processing capability are contained in the multimedia message that has arrived, an external terminal can be connected to the transmission-destination mobile wireless communication terminal to extend the processing capability to handle the format of the multimedia message that has arrived. As a result, problems such as the inability of the transmission-destination mobile wireless communication terminal to receive a multimedia message that has arrived can be avoided.

In another aspect of the present invention, a transmission-origin mobile wireless communication terminal that transmits a multimedia message transmits format information for each media type of a multimedia message that is to be transmitted, destination information of the multimedia message, and the multimedia message to a MMS user database server. Based on the format information for each media type and the destination information that have been received from the transmission-origin mobile wireless communication terminal and information regarding the processing capability for each media type for each mobile wireless communication terminal that has been stored, the MMS user database server then determines whether the multimedia message that is transmitted by the transmission-origin mobile wireless communication terminal can be received at each of the transmission-destination mobile wireless communication terminals.

When a mobile wireless communication terminal that cannot receive the multimedia message is included among the transmission-destination mobile wireless communication terminals, the data format of the multimedia message that has been received from the transmission-origin mobile wireless communication terminal is modified to a format that can be received at all of the transmission-destination mobile wireless communication terminals and stored in MMS servers. The MMS user database server then transmits to the transmission-destination mobile wireless communication terminals a reception notice indicating that a multimedia message has arrived. After receiving the reception notice, the transmission-destination mobile wireless communication terminals send a reception request to the MMS user database server indicating the desire to receive the multimedia message. After receiving the reception request from the transmission-destination mobile wireless communication terminals, the MMS user database server transmits the multimedia message that is stored in the MMS servers to the transmission-destination mobile wireless communication terminals.

According to the present invention, a multimedia message from a transmission-origin mobile wireless communication terminal is automatically modified to a media type and data format that can be received in transmission-destination mobile wireless communication terminals and then transmitted to each mobile wireless communication terminal. As a result, the occurrence of problems such as the inability of a transmission-destination mobile wireless communication terminal to receive a multimedia message that has been transmitted from a transmission-origin mobile wireless communication terminal can be avoided, in particular, without necessitating the alteration of the data format of the multimedia message at the transmission-origin mobile wireless communication terminal.

In an embodiment of the present invention, an additional step is included in which each mobile wireless communication terminal transmits new information on the processing capability for each media type to the MMS user database server when an external terminal is connected to each mobile wireless communication terminal to change the processing capability for each media type.

The above and other objects, features, and advantages of the present invention will become apparent from the following description with reference to the accompanying drawings, which illustrate examples of the present invention.

BRIEF DESCRIPTION OF THE DRAWINGS

FIG. 7 is a sequence chart for explaining the operation of the multimedia communication system of the second embodiment of the present invention.

DETAILED DESCRIPTION OF THE PREFERRED EMBODIMENTS

Figure 1:
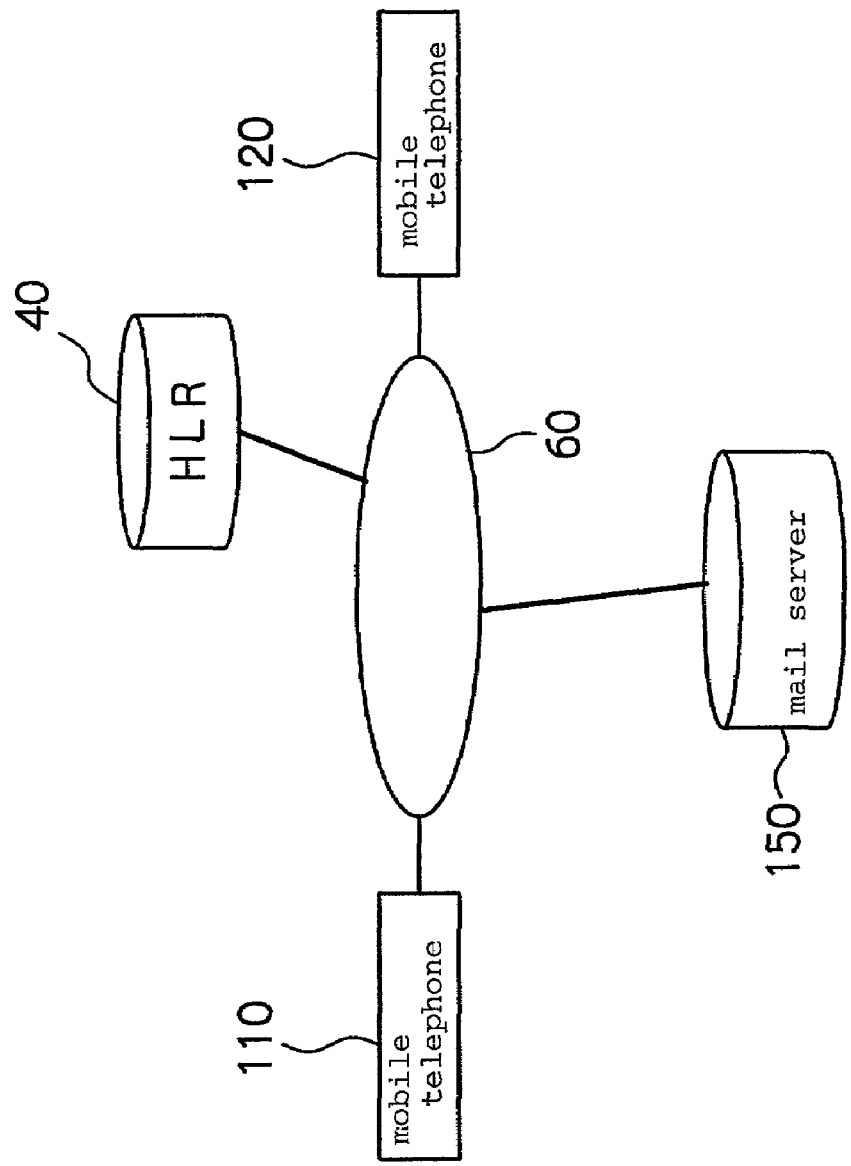
FIG. 1 is a system chart showing the configuration of a mobile telephone system of the prior art.
Figure 2:
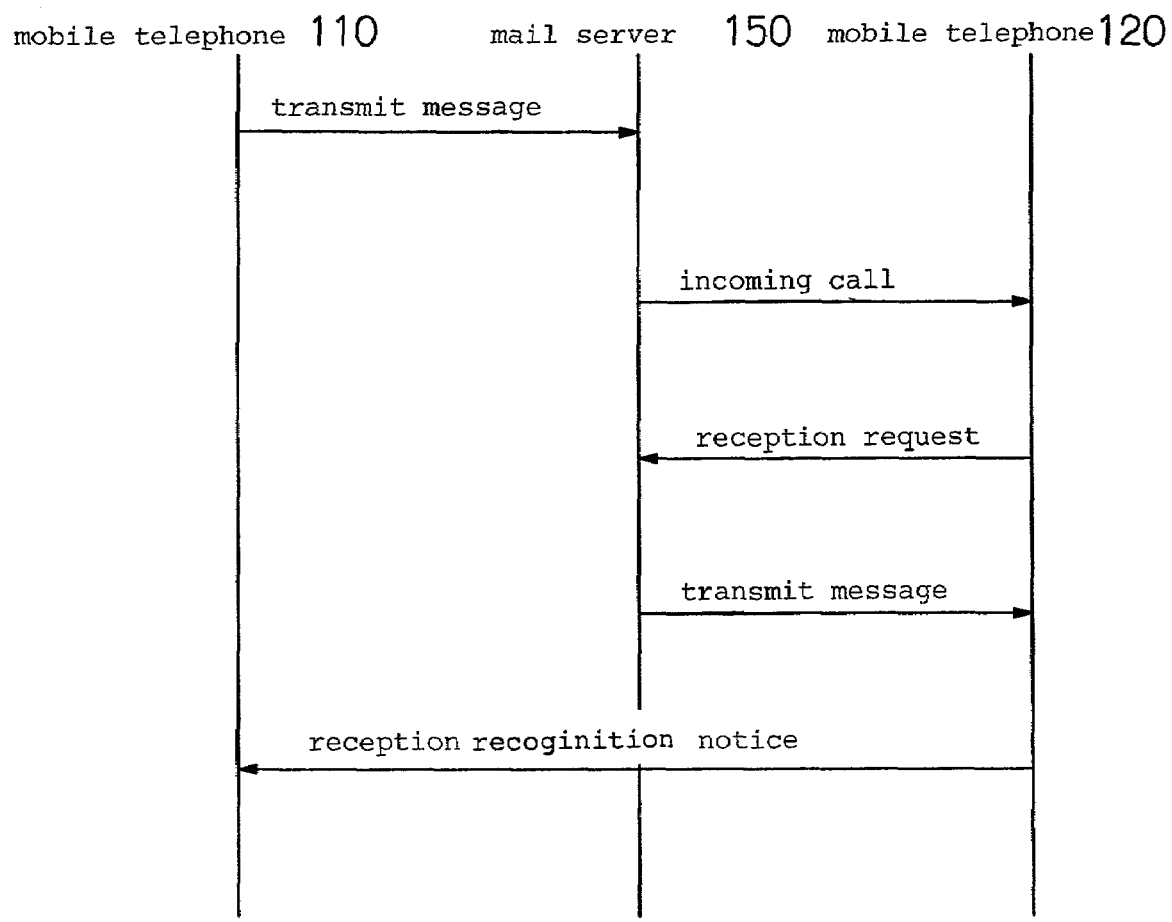
FIG. 2 is a sequence chart for explaining the operation of the prior-art mobile telephone system shown in FIG. 1.
Figure 3:
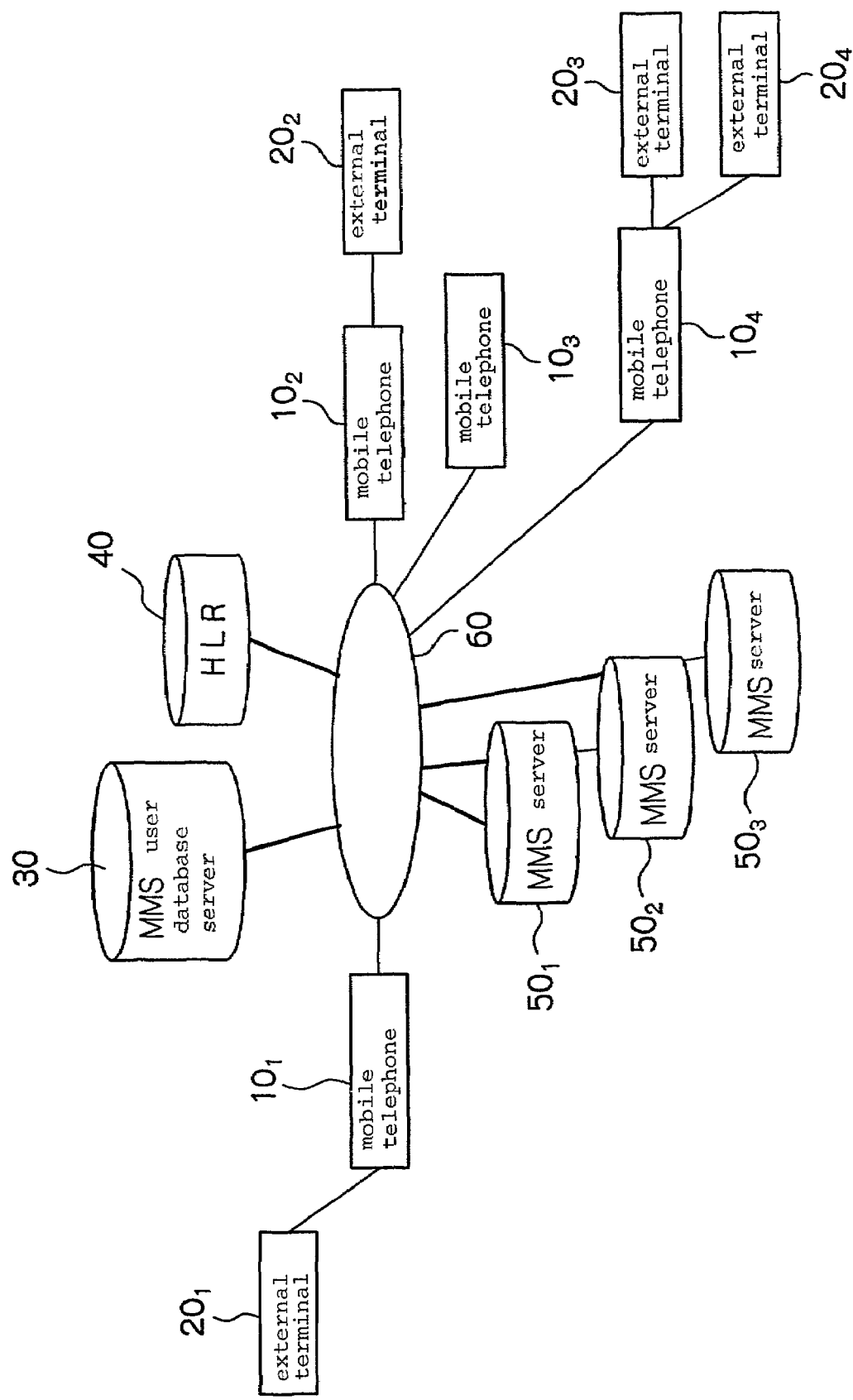
FIG. 3 is a system chart showing the configuration of the multimedia communication system of the first embodiment of the present invention.

First Embodiment:

Referring now to FIG. 3, there is shown a multimedia communication system according to the first embodiment of the present invention. In FIG. 3, constituent elements that are identical to constituent elements in FIG. 1 are designated by the same reference numerals and redundant explanation thereof is omitted. In addition, although the mobile wireless communication terminal in the present embodiment is, for example, a mobile telephone having CDMA communication capability, the present invention is not limited thereto.

As shown in FIG. 3, in the multimedia communication system of the present embodiment, mobile telephones $10_1$-$10_4$, MMS servers $50_1$-$50_3$, HLR 40, and MMS user database server 30 are interconnected by network 60. Network 60 comprises, for example, a mobile communication network of a base station and a base station control device, and an exchange network such as an exchange device. MMS user database server 30 may be arranged in either the mobile communication network or the exchange network.

In addition, external terminal $20_1$ is connected to mobile telephone $10_1$, external terminal $20_2$ is connected to mobile telephone $10_2$, and external terminals $20_3$ and $20_4$ are connected to mobile telephone $10_4$.

MMS servers $50_1$-$50_3$ are servers for storing multimedia messages by media type. For example, MMS server $50_1$ stores text data, MMS server $50_2$ stores graphics data and video data, and MMS server $50_3$ stores audio data. Although multimedia messages are stored by three MMS servers $50_1$-$50_3$ in the present example, the number of MMS servers is not limited to three, and all types of multimedia messages may be held in a single MMS server, or multimedia messages may be held in two or four or more MMS servers.

Information regarding the media type of data that can be received as a message by each of mobile telephones $10_1$-$10_4$ and the format for each media type that can be received (processing capability information for each media type for each of mobile telephones $10_1$-$10_4$) is stored in MMS user database server 30.

Figure 4:
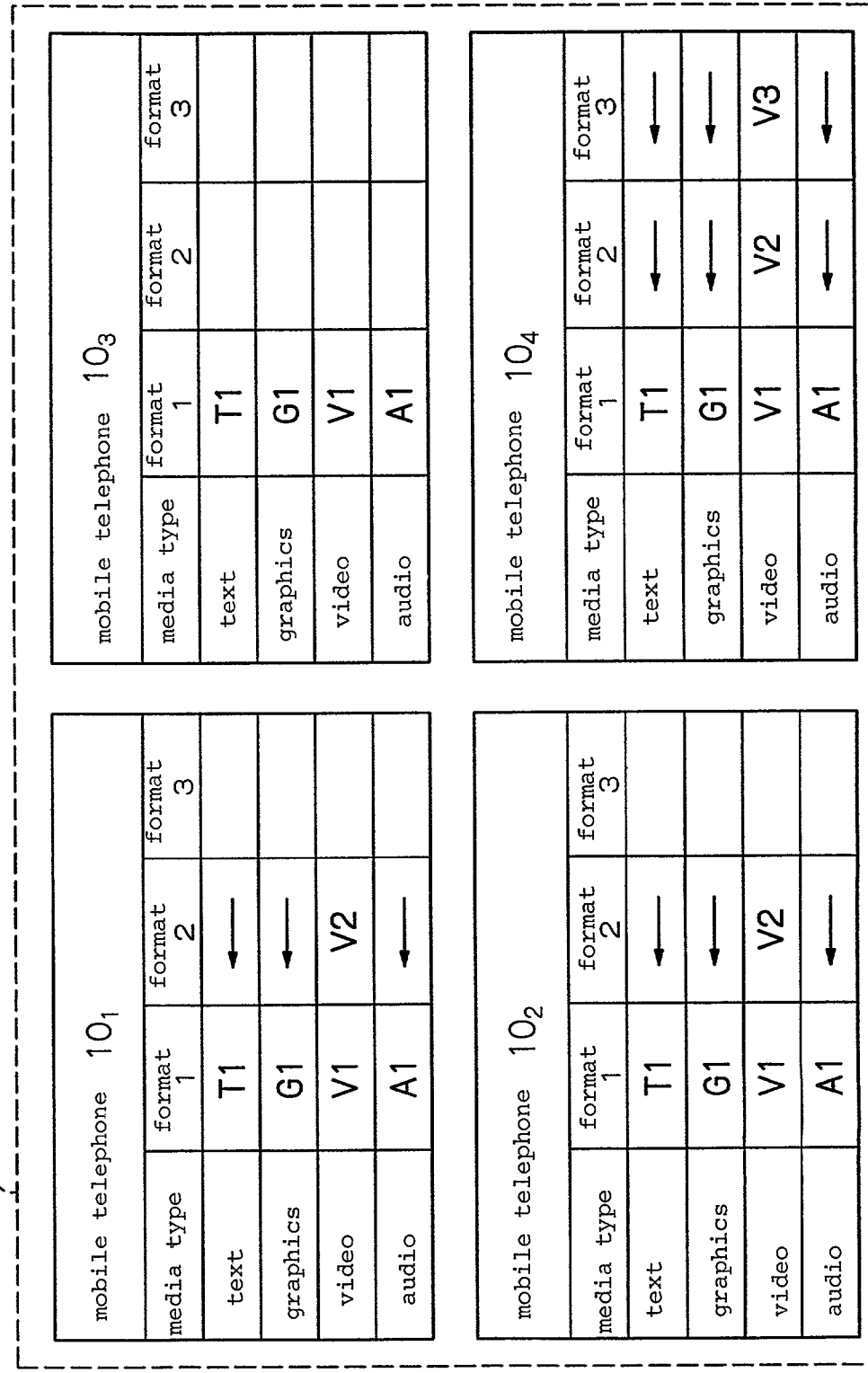
FIG. 4 shows an example of data that are registered in MMS user database server 30 in FIG. 3.

FIG. 4 shows an example of the data that indicate the processing capability for each media type for each of mobile telephones $10_1$-$10_4$ that is stored in MMS user database server 30.

Each of mobile telephones $10_1$-$10_4$ has the capability to receive text data of format T1, graphics data of format G1, video data of format V1, and audio data of format A1 (multimedia data of format 1) when an external terminal is not connected. The connection of an external terminal enables an extension of the range of data formats that each of mobile telephones $10_1$-$10_4$ can receive.

For example, the current connection of external terminal $20_1$ to mobile telephone $10_1$ enables the reception of not only multimedia data of format 1, but of multimedia data (media data of format 2) that includes video data of format V2. The arrows in FIG. 4 indicate that the media type is the same as the media type of format 1. Similarly, the current connection of external terminal $20_2$ to mobile telephone $10_2$ enables the reception of multimedia data of formats 1 and 2, and the current connection of external terminals $20_3$ and $20_4$ to mobile telephone $10_4$ enables the reception of multimedia data of formats 1, 2, and 3.

When each of mobile telephones $10_1$-$10_4$ is first connected to network 60 upon turning on the power supply, information regarding the media types and formats that can currently be received as messages is transmitted to MMS user database server 30. Each of mobile telephones $10_1$-$10_4$ transmits in any way new information regarding the processing capability for each media type to MMS user database server 30 when an external terminal is connected and the processing capability for each media type changes while the power supply is turned on.

More specifically, when an external terminal is connected to modify the media types or formats that can be received, new information regarding processing capability for each media type may be automatically transmitted from a mobile telephone to MMS user database server 30. Alternatively, new information regarding the processing capability for each media type may be transmitted to MMS user database server 30 when a mobile telephone moves and transmits positional information to network 60. Alternatively, rather than automatically transmitting from the mobile telephone, new information regarding the processing capability for each media type may be transmitted to MMS user database server 30 according to manipulation by the user.

Figure 5:
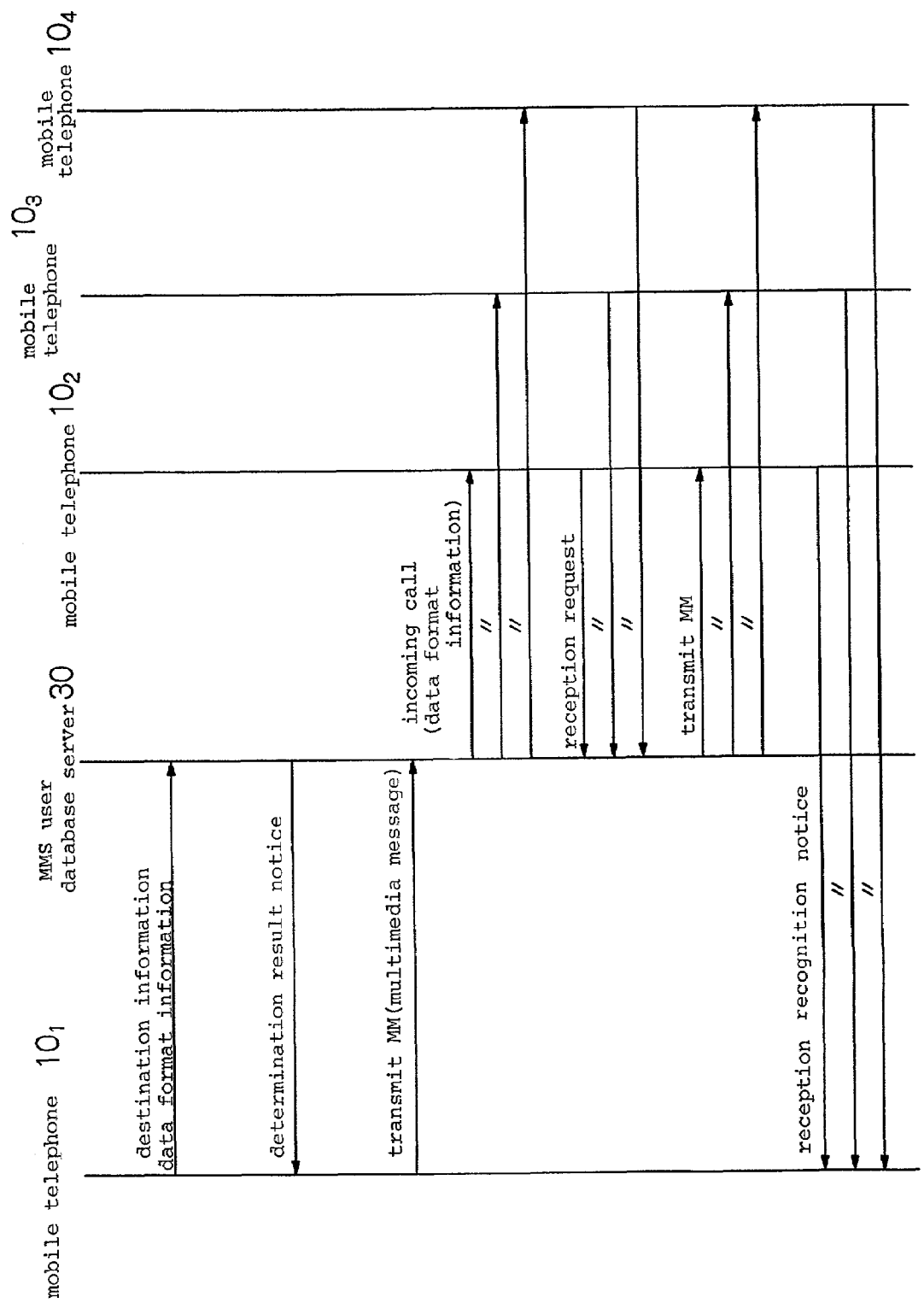
FIG. 5 is a sequence chart for explaining the operation of the multimedia communication system of the first embodiment that is shown in FIG. 3.

FIG. 5 shows a sequence chart for explaining the details of the operation of the multimedia communication system of the present embodiment. The following explanation is a case in which a multimedia message of format 2 (text T1, graphics G1, video V2, and audio A1) is transmitted from mobile telephone $10_1$ to mobile telephones $10_2$-$10_4$. Explanation regarding the control procedures for accessing network 60 from the mobile telephones is here omitted.

Before transmitting a multimedia message of the above-described format 1, mobile telephone $10_1$ notifies MMS user database server 30 of information regarding the formats for each media type of the multimedia message that is to be transmitted and the destination information of the multimedia message, i.e., information indicating that mobile telephones $10_2$-$10_4$ are the destinations.

Based on the information regarding the formats of each media type and the destination information that have been received from mobile telephone $10_1$ as well as information that is stored regarding the processing capabilities for each media type for each of mobile telephones $10_1$-$10_4$, MMS user database server 30 first determines whether the multimedia message that is to be transmitted by mobile telephone $10_1$ can be received at transmission-destination mobile telephones $10_2$-$10_4$, and then notifies mobile telephone $10_1$ of these determination results together with information regarding the formats that can be received by mobile telephone $10_3$, which is unable to receive the multimedia message. In the present embodiment, mobile telephone $10_2$ and mobile telephone $10_4$ are able to receive data of format 2, but mobile telephone $10_3$ is able to receive only video data of format V1. MMS user database server 30 therefore transmits to mobile telephone $10_1$ the determination result that mobile telephone $10_3$ is unable to receive data of format 2 as well as the information that the only format that mobile telephone $10_3$ can receive is format 1 (text T1, graphics G1, video V1, and audio A1).

Mobile telephone $10_1$ displays the determination results from MMS user database server 30 to the user and waits for entry from the user. If, based on the displayed determination results, the user decides not to transmit the multimedia message to mobile telephone $10_3$, which is unable to receive data of format 2, the multimedia message is sent only to mobile telephones $10_2$ and $10_4$; but if the user is not concerned by the inclusion of a data format that cannot be received, the multimedia message is transmitted to all of mobile telephones $10_2$-$10_4$. Alternatively, the user of mobile telephone $10_1$ may modify the data of format 2 to data of format 1 that can be received by all of mobile telephones $10_2$-$10_4$ and then transmit the multimedia message. In the following explanation, a case is described in which the message is transmitted to the planned mobile telephones $10_2$-$10_4$ without modifying all of the formats of the data that is transmitted as a message.

Upon receiving from mobile telephone $10_1$ the multimedia message of the format that was finally determined for transmission at mobile telephone $10_1$, MMS user database server 30 both holds the multimedia message in MMS servers $50_1$-$50_3$ according to each media type and reports the incoming call to notify mobile telephones $10_2$-$10_4$ that are the finally determined destinations that a multimedia message has arrived. MMS user database server 30 also notifies mobile telephone $10_3$ that video data that are included in the arrived multimedia message is of format V2, which cannot be received.

After receiving the incoming call notification from MMS user database server 30, mobile telephones $10_2$-$10_4$ each transmit a reception request to MMS user database server 30 to check the content of the transmitted multimedia message. Because an incoming call notice has been transmitted to mobile telephone $10_3$ that includes the information that video data of format V2 that cannot be received are included in the multimedia message that has arrived, the user of mobile telephone $10_3$ decides whether or not to receive the video data. If the user decides to receive the video data, the user transmits a reception request for the multimedia message after first connecting an external terminal to enable reception of video data of format V2. If the user decides to receive only the data other than the video data and decides that there is no need to receive the video data, the user may receive the multimedia message without connecting the external terminal.

After receiving reception requests from mobile telephones $10_2$-$10_4$, MMS user database server 30 transmits the content of the multimedia message that is held in MMS servers $50_1$-$50_3$ to each of mobile telephones $10_2$-$10_4$. After having received the message from MMS user database server 30, mobile telephones $10_2$-$10_4$ transmit a reception recognition notice by way of network 60 to mobile telephone $10_1$ indicating that all types of data included in the multimedia message have been received.

The reception recognition notices that are sent from mobile telephones $10_2$-$10_4$ that have received the multimedia message to mobile telephone $10_1$ that transmitted the multimedia message is not necessary to the present invention.

Figure 6:
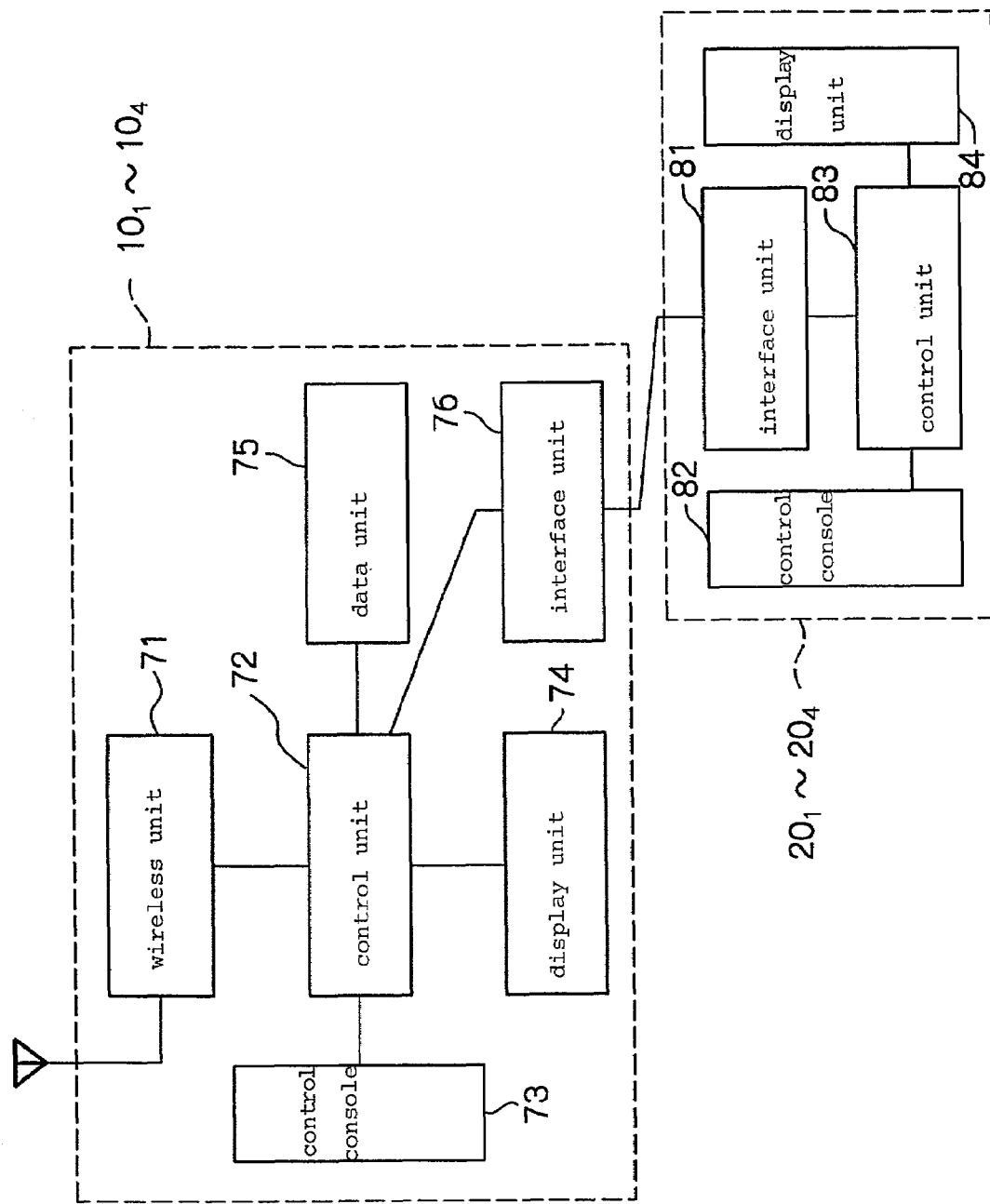
FIG. 6 is a block diagram showing the configuration of mobile telephones $10_1$-$10_4$ and external terminals $20_1$-$20_4$.

FIG. 6 is a block diagram showing the configuration of mobile telephones $10_1$-$10_4$ and external terminals $20_1$-$20_4$ in the present embodiment.

As shown in FIG. 6, mobile telephones $10_1$-$10_4$ comprises wireless unit 71, control unit 72, control console 73, display unit 74, data unit 75, and interface unit 76.

Wireless unit 71 performs transmission and reception of data with a base station (not shown) that constitutes a part of network 60 by way of wireless lines, for example, by CDMA wireless communication. Control console 73 performs, through the operation of a user, the entry of various types of data or instructions enabling or preventing transmission of multimedia messages. Display unit 74 displays various data according to instructions from control unit 72 and displays the determination results from MMS user database server 30. Data unit 75 stores and reads various data in accordance with instructions from control unit 72. Interface unit 76 performs transmission and reception of data with external terminals $20_1$-$20_4$.

Control unit 72 cause display unit 74 to display the determination results that have been received from MMS user database server 30 or information regarding formats that can be received by a mobile telephone that cannot receive the multimedia message based on these determination results. In addition, control unit 72 receives entry information such as the designation of transmission-destination mobile telephones to which a multimedia message is to be transmitted, and the designation of the format of a multimedia message that is to be transmitted. Furthermore, control unit 72 controls wireless unit 71 to transmit data to and receive data from MMS user database server 30, stores in data unit 75 information such as a multimedia message that is to be transmitted, and controls interface unit 76 to perform the connection with external terminals $20_1$-$20_4$, the transmission and reception of data and the like.

As shown in FIG. 6, external terminals $20_1$-$20_4$ each comprise interface unit 81, control console 82, control unit 83, and display unit 84.

Interface unit 81 performs the transmission of data to and the reception of data from mobile telephones $10_1$-$10_4$. Control console 82 performs the entry of various data through the operation from the user. Display unit 84 displays various data according to instructions from control unit 83. Control unit 83 also controls interface unit 81 to perform connections with mobile telephones $10_1$-$10_4$ and transmission and reception of data.

In the multimedia communication system of the present embodiment, MMS user database server 30 has the capability to register the processing capabilities for each media type of each of mobile telephones $10_1$-$10_4$, whereby a transmission-origin mobile telephone can transmit a multimedia message after checking the processing capabilities of transmission-destination mobile telephones even when an external terminal is connected to a mobile telephone to extend the range of types and formats of multimedia messages that can be received. The present embodiment therefore enables avoidance of the occurrence of problems such as the inability of a transmission-destination mobile telephone to receive a multimedia message that has been transmitted from a transmission-origin mobile telephone, and can eliminate confusion when transmitting and receiving multimedia messages.

In addition, when data of a format that exceeds the processing capability of a mobile telephone is included in a multimedia message that has arrived, this fact is transmitted in advance together with an incoming call notice to mobile telephones that are to receive the multimedia message, and as a result, the occurrence of problems such as the inability to receive a multimedia message that has arrived can be avoided.

Second Embodiment

The multimedia communication system according to the second embodiment of the present invention will be explained hereinafter. The configuration of the multimedia communication system of the present embodiment is similar to the configuration of the first embodiment of the multimedia communication system that is shown in FIG. 3 with the exception of a portion of the processing operations of MMS user database server 30.

In the above-described first embodiment, MMS user database server 30 determines whether a multimedia message that is to be transmitted can be received at transmission-destination mobile telephones based on destination information and data format information that have been received from mobile telephone $10_1$ and reports the determination results. In contrast, MMS user database server 30 in the second embodiment of the present invention is adapted to modify the data format of the multimedia message to a format that can be received at the transmission-destination mobile telephones and then transmitted, when the data format of a multimedia message that is transmitted from a transmission-origin mobile telephone is a format that cannot be received by a transmission-destination mobile telephone.

The operation in the multimedia communication system of the present embodiment will be next described with reference to FIG. 7.

Mobile telephone $10_1$ first transmits the multimedia message that is to be transmitted to mobile telephones $10_2$-$10_4$ together with destination information and data format information to MMS user database server 30 by way of network 60. modification Based on information regarding the processing capabilities for each media type that is registered for each of mobile telephones $10_1$-$10_4$, MMS user database server 30 first determines whether or not the multimedia message that is transmitted by mobile telephone $10_1$ can be received by transmission-destination mobile telephones $10_2$-$10_4$. When a mobile telephone that is unable to receive the multimedia message is included among the transmission-destination mobile telephones, MMS user database server 30 modifies the data format of the multimedia message to a format that can be received by all of the transmission-destination mobile telephones and then stores the multimedia message in MMS servers $50_1$-$50_3$.

Subsequent operations by which MMS user database server 30 notifies each of transmission-destination mobile telephones $10_2$-$10_4$ of the incoming call and transmits the multimedia message based on reception requests from each of the transmission-destination mobile telephones $10_2$-$10_4$ is identical to the operations of the first embodiment, and explanation thereof is therefore omitted.

In the multimedia communication system of the present embodiment, a multimedia message from transmission-origin mobile telephone $10_1$ is automatically modified to data of a media type and format that can be received in transmission-destination mobile telephone $10_3$ and then transmitted to each of mobile telephones $10_2$-$10_4$. As a result, the occurrence of problems such as the inability for transmission-destination mobile telephone $10_3$ to receive a multimedia message that has been transmitted from mobile telephone $10_1$ can be avoided without taking such measures as modifying the data format of the multimedia message at mobile telephone $10_1$. Compared to the multimedia communication system of the first embodiment, the present embodiment has the advantage of enabling a reduction in the number of operations in mobile telephone $10_1$, which is the transmission origin of a multimedia message.

While preferred embodiments of the present invention have been described using specific terms, such description is for illustrative purposes only, and it is to be understood that changes and variations may be made without departing from the spirit or scope of the following claims.

What is claimed is:

1. In a multimedia communication system including a plurality of mobile wireless communication terminals and a network for interconnecting each of said mobile wireless communication terminals for transmitting and receiving multimedia messages comprising data of a plurality of media types between ones of said mobile wireless communication terminals, a method of transmitting and receiving messages, comprising:
   at a transmission-origin mobile wireless communication terminal that is to transmit a multimedia message:
      transmitting data format information, for each media type of a multimedia message that is to be transmitted and destination information for the multimedia message, to a multimedia message service (MMS) user database server in which is stored processing capability information regarding each media type for each mobile wireless communication terminal the processing capability information comprising information regarding media types of data that can be received as a message by each of said mobile wireless communication terminals and regarding data formats for each media type that can be received;
   at said MMS user database server:
      determining whether the multimedia message that is to be transmitted by said transmission-origin mobile wireless communication terminal can be received at each of said transmission-destination mobile wireless communication terminals, based on the destination information and data format information for each media type that have been received from said transmission-origin mobile wireless communication terminal and said processing capability information regarding each media type for each of said mobile wireless communication terminals that is stored; and
      notifying said transmission-origin mobile wireless communication terminal of the determination results together with information regarding data formats that can be received by mobile wireless communication terminals that cannot receive data as formatted in the multimedia message;

at said transmission-origin mobile wireless communication terminal that has received said determination results from said MMS user database server
transmitting the multimedia message in the data format that is finally determined for transmission to said MMS user database server with the transmission-destination mobile wireless communication terminals that are finally determined as the destinations;
at said MMS user database server that has received the multimedia message from said transmission-origin mobile wireless communication terminal:
storing the multimedia message in MMS servers, and transmitting to transmission-destination mobile wireless communication terminals a reception notice indicating that a multimedia message has arrived;
at transmission-destination mobile wireless communication terminals that have received said reception notice:
sending a reception request to said MMS user database server indicating a desire to receive the multimedia message; and
at said MMS user database server that has received said reception requests from said transmission-destination mobile wireless communication terminals:
transmitting the multimedia message that is stored in said MMS servers to said transmission-destination mobile wireless communication terminals.

2. A method according to claim 1, further comprising:
at said MMS user database server that has received a multimedia message from said transmission-origin mobile wireless communication terminal:
reporting that data of a media type and of a data format that cannot be received are contained in the multimedia message at a time of transmitting to the transmission-destination mobile wireless communication terminals, the reception notice indicating that a multimedia message has arrived.

3. A method according to claim 2, further comprising:
at any of said mobile wireless communication terminals:
transmitting to said MMS user database server new processing capability information regarding each media type, when an external terminal is connected to said mobile wireless communication terminal such that the processing capability for each media type changes.

4. A method according to claim 1, further comprising:
at any of said mobile wireless communication terminals:
transmitting to said MMS user database server new processing capability information regarding each media type, when an external terminal is connected to said mobile wireless communication terminal such that the processing capability for a media type has been changed.

5. In a multimedia communication system including a plurality of mobile wireless communication terminals and a network for interconnecting each of said mobile wireless communication terminals for selectively transmitting and receiving multimedia messages comprising data of a plurality of media types between selected ones of said mobile wireless communication terminals, a method of transmitting and receiving messages comprising:
at a transmission-origin mobile wireless communication terminal that is to transmit a multimedia message:
transmitting data format information for each media type of the multimedia message that is transmitted, destination information for the multimedia message, and the multimedia message, to a multimedia message service (MMS) user database server in which Is stored processing capability information regarding each media type for each mobile wireless communication terminal, the processing capability information comprising information regarding media types of data that can be received as a message by each of said mobile wireless communication terminals and regarding data formats for each media type that can be received;
at said MMS user database server:
determining whether the multimedia message that has been transmitted by said transmission-origin mobile wireless communication terminal can be received at each of said transmission-destination mobile wireless communication terminals, based on the destination information and data format information for each media type that have been received from said transmission-origin mobile wireless communication terminal and said processing capability information for each media type for each of said mobile wireless communication terminals that is stored;
modifying the data format of the multimedia message that has been received from said transmission-origin mobile wireless communication terminal to a data format that can be received at each of the transmission-destination mobile wireless communication terminals;
storing in MMS servers when a mobile wireless communication terminal that cannot receive the transmitted message is included among the transmission-destination mobile wireless communication terminals; and
transmitting to transmission-destination mobile wireless communication terminals a reception notice Indicating that a multimedia message has arrived;
at transmission-destination mobile wireless communication terminals that have received said reception notice:
sending a reception request to said MMS user database server indicating a desire to receive the multimedia message; and
at said MMS user database server that has received said reception requests from said transmission-destination mobile wireless communication terminals:
transmitting the multimedia message that is stored in said MMS servers to said transmission-destination mobile wireless communication terminals.

6. A method according to claim 5, further comprising:
at any of said mobile wireless communication terminals:
transmitting to said MMS user database server new processing capability information regarding each media type, when an external terminal is connected to said mobile wireless communication terminal such that the processing capability for each media type changes.

7. A method of transmitting and receiving messages according to claim 5, wherein at least one media type has a plurality of data formats.

8. A multimedia communication system including a plurality of mobile wireless communication terminals and a network for interconnecting each of said mobile wireless communication terminals, said system comprising:
one or a plurality of multimedia message service (MMS) servers for storing multimedia messages that comprise a plurality of media data; and
an MMS user database server, said MMS user database server including:
means for storing processing capability information regarding each media type for each mobile wireless communication terminal, the processing capability information being information regarding the media types of data that each of said mobile wireless communication terminals can receive as a message and the data formats of each media type that can be received;

means for determining whether a multimedia message that is to be transmitted by a transmission-origin mobile wireless communication terminal can be received at each transmission-destination mobile wireless communication terminal, based on destination information and data format information for each media type that have been received from said transmission-origin mobile wireless communication terminal and said processing capability information that is stored regarding each media type for each of said mobile wireless communication terminals;

means for notifying said transmission-origin mobile wireless communication terminal of determination results together with information regarding data formats that can be received by mobile wireless communication terminals that cannot receive the multimedia message;

means for storing, in said MMS servers, the multimedia message that is transmitted from said transmission-origin mobile wireless communication terminal in a data format that is finally determined for transmission;

means for transmitting to transmission-destination mobile wireless communication terminals that have finally been determined, at said transmission-origin mobile wireless communication terminal, a reception notice indicating that a multimedia message has arrived; and means for transmitting the multimedia message that has been stored in said MMS servers to transmission-destination mobile wireless communication terminals upon receipt of reception requests from transmission-destination mobile wireless communication terminals that have received said reception notice.

9. A system according to claim 8, said MMS user database server further including means for, when the MMS user database server that has received a multimedia message from a transmission-origin mobile wireless communication terminal transmits a reception notice indicating that the multimedia message has arrived to transmission-destination mobile wireless communication terminals, notifying that data of a media type and of a data format that cannot be received are included in the multimedia message.

10. A system according to claim 9, further including means for transmitting to said MMS user database server new processing capability information for each media type when an external terminal has been connected to each of said mobile wireless communication terminals and the processing capability for each media type has been changed.

11. A system according to claim 8, further including means for transmitting to said MMS user database server new processing capability information for each media type when an external terminal has been connected to any of said mobile wireless communication terminals such that the processing capability for each media type has been changed.

12. A multimedia communication system for serving a plurality of mobile wireless communication terminals, said system including a network for interconnecting each of said mobile wireless communication terminals, said system comprising:

one or a plurality of multimedia message service (MMS) servers for storing multimedia messages that comprise a plurality of media data, and an MMS user database server;

said MMS user database server including:

means for storing processing capability information regarding each media type for each mobile wireless communication terminal to be served, the processing capability information being information regarding the media types that each of said mobile wireless communication terminals can receive as a message and data formats for each media type that can be received;

means for determining whether a multimedia message that is transmitted by a transmission-origin mobile wireless communication terminal can be received at each transmission-destination mobile wireless communication terminal based on destination information and data format information for each media type that have been received from said transmission-origin mobile wireless communication terminal and said processing capability information that is stored regarding each media type for each of said mobile wireless communication terminals;

means for modifying the data format of a multimedia message that has been received from said transmission-origin mobile wireless communication terminal to a data format that can be received by all of the transmission-destination mobile wireless communication terminals when a mobile wireless communication terminal that is unable to receive the multimedia message is included among the transmission-destination mobile wireless communication terminals;

means for storing the modified multimedia message in said MMS servers;

means for transmitting to transmission-destination mobile wireless communication terminals a reception notice indicating that a multimedia message has arrived; and means for transmitting the multimedia message that has been stored in said MMS servers to transmission-destination mobile wireless communication terminals upon receipt of reception requests from transmission-destination mobile wireless communication terminals that have received said reception notice.

13. A system according to claim 12, further including means for transmitting to said MMS user database server new processing capability information for each media type when an external terminal has been connected to any of said mobile wireless communication terminals such that the processing capability for each media type changes.

14. A multimedia communication system according to claim 12, wherein at least one media type has a plurality of data formats.

15. A mobile wireless communication terminal that is capable of multimedia communication for transmitting multimedia messages comprising data of a plurality of media types to, and receiving multimedia messages from, other mobile wireless communication terminals that are connected to a same network by way of said network, said mobile wireless communication terminal comprising:

means for, when a multimedia message is to be transmitted to other mobile wireless communication terminals, transmitting data format information for each media type of the multimedia message that is to be transmitted and destination information of the multimedia message to a multimedia message service (MMS) user database server in which is stored processing capability information regarding each media type for each mobile wireless communication terminal the processing capability information comprising information regarding the media types of data that can be received as a message by each of said mobile wireless communication terminals and data formats for each media type that can be received;

means for, upon receiving from said MMS user database server determination results in which it is determined whether a multimedia message cain be received at each of the transmission-destination mobile wireless communication terminals and data format information regarding data formats that can be received by mobile wireless communication terminals that are unable to receive the multimedia message, making a final determination of the data formats for transmission and the transmission-destination mobile wireless communication terminals, based on the determination results and data format information;

means for transmitting to said MMS user database server the multimedia message of the finally determined data format with the transmission-destination mobile wireless communication terminals that are finally determined as the destinations; and means for, when a reception notice indicating that a multimedia message has arrived is transmitted in from said MMS user database server, sending a reception request to said MMS user database server indicating a desire to receive the multimedia message, and receiving the multimedia message that is transmitted from said MMS user database server.

16. A mobile wireless communication terminal according to claim 15, further including means for transmitting new processing capability information for each media type to said MMS user database server when an external terminal is connected and a processing capability for each media type has been changed.

* * * * *